United States Patent [19]
Katoh et al.

[11] Patent Number: 5,339,085
[45] Date of Patent: Aug. 16, 1994

[54] THREE-DIMENSIONAL RADAR DISPLAY

[75] Inventors: Yoshiyuki Katoh; Masatoshi Kameyama, both of Kamakura; Shigekichi Higo, Amagasaki, all of Japan

[73] Assignee: Mitsubishi Denki Kabushiki Kaisha, Tokyo, Japan

[21] Appl. No.: 88,426

[22] Filed: Jul. 7, 1993

[30] Foreign Application Priority Data

Jul. 14, 1992 [JP] Japan .................................. 4-208576

[51] Int. Cl.⁵ ................................................ G01S 7/20
[52] U.S. Cl. ...................................... 342/180; 342/185
[58] Field of Search .......................... 342/176, 180, 185

Primary Examiner—John B. Sotomayor
Attorney, Agent, or Firm—Wolf, Greenfield & Sacks

[57] ABSTRACT

By performing rotation and translation operations, a radar display converts a radar signal to radar image information expressed in a three-dimensional orthogonal coordinate system with horizontal, vertical, and depth coordinates related to a certain viewpoint. Terrain and target information is converted to the same coordinate system and combined with the radar image information, producing a realistic three-dimensional display. Clipping is performed in the depth direction to eliminate portions of the radar image disposed behind terrain or target images. Terrain and target images disposed behind the radar image are reduced in intensity, but not clipped. Perspective projection and zoom transformations may also be carried out.

18 Claims, 5 Drawing Sheets

FIG. 6

THREE-DIMENSIONAL RADAR DISPLAY

BACKGROUND OF THE INVENTION

The present invention relates to a radar display suitable for use in an air traffic control system.

Air traffic control radars generally employ a display of the plan position indicator (PPI) type, which shows a plan view of a circular area with the radar antenna at the center. The plan position of an aircraft is shown on the display by a blip, often tagged with computer-generated alphanumeric information indicating, for example, the aircraft's altitude. The display may also show backscatter (referred to as radar clutter) from terrain, weather, birds, and other objects, and superimposed information such as runway patterns.

A disadvantage of this type of display is that, since the operator has only a two-dimensional plan view of the area scanned by the radar, he or she cannot easily discern three-dimensional relationships. In particular, even though altitude may be indicated as tag information, it is difficult to see the altitude relationships between different aircraft at a glance, and nearly impossible to visualize the three-dimensional relationships among aircraft, terrain, and general radar clutter.

SUMMARY OF THE INVENTION

It is accordingly an object of the present invention to display a radar signal as a three-dimensional image seen from a particular viewpoint.

Another object of the invention is to show three-dimensional relationships among aircraft, and between aircraft and terrain.

Yet another object of the invention is to show depth relationships between general radar clutter on the one hand and aircraft and terrain on the other hand.

Still another object is to enable aircraft and terrain to be easily distinguished from general radar clutter.

The present invention processes a radar signal to obtain digital information comprising radar echo amplitude information and polar coordinate information, the polar coordinate information comprising a range, an elevation angle, and an azimuth angle. The polar coordinate information is then converted to radar image coordinate information expressed in a three-dimensional orthogonal coordinate system having a horizontal coordinate, a vertical coordinate, and a depth coordinate. This three-dimensional orthogonal coordinate system represents position in relation to a certain viewpoint, not necessarily located at the radar antenna. The echo amplitude information is stored as radar image information in a radar image frame buffer at addresses corresponding to the horizontal coordinate and vertical coordinate, and is read out for display on a display unit at positions corresponding to these addresses.

To display aircraft (referred to as targets) and terrain, the invention converts this information to the above three-dimensional orthogonal coordinate system and stores the resulting image information in a terrain and target image frame buffer at addresses corresponding to the horizontal and vertical coordinates, while storing depth-coordinate information in a depth coordinate buffer. Terrain and target depth-coordinate information stored in the depth coordinate buffer is compared with depth-coordinate information of the radar image, and radar echo amplitude information is not stored in the radar image frame buffer if its depth coordinate exceeds the depth coordinate of terrain and target information at the same address. Terrain and target image information stored in the terrain and target image frame buffer is read out and combined by addition with radar image information stored in the radar image frame buffer. Terrain and target image intensity is reduced in proportion to radar image intensity, so that the radar image is displayed in a semi-transparent manner, enabling terrain and target objects to be seen even when disposed behind radar clutter.

DETAILED DESCRIPTION OF THE INVENTION

The invention will now be described with reference to the attached drawings. These drawings are intended to illustrate the invention but not to restrict its scope, which should be determined solely from the appended claims.

Figure 1:
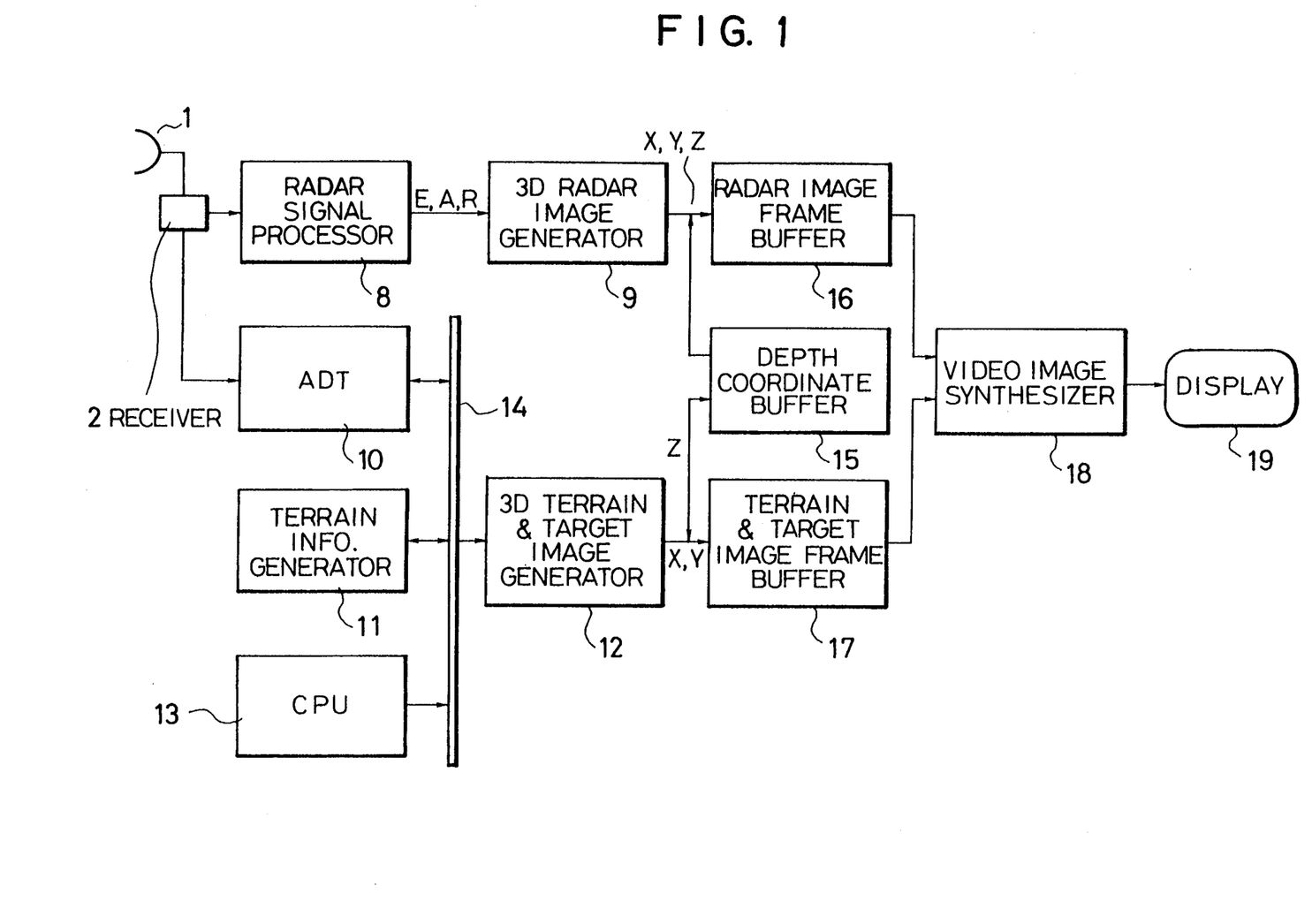
FIG. 1 is a block diagram of the invented radar display.

Referring to FIG. 1, the invented radar display operates in conjunction with an antenna 1 and receiver 2, and comprises a radar signal processor 8, a three-dimensional radar image generator 9, an automatic detection and tracking unit 10, a terrain information generator 11, a three-dimensional terrain and target image generator 12, a central processing unit 13, a data bus 14, a depth coordinate buffer 15, a radar image frame buffer 16, a terrain and target image frame buffer 17, a video image synthesizer 18, and a display unit 19.

The antenna 1 transmits radar pulses and receives reflected echoes, which the receiver 2 amplifies to generate a radar signal. From this radar signal, the radar signal processor 8 generates digital information comprising echo amplitude information and polar coordinate information. The polar coordinate information comprises a range value (R), an azimuth angle (A), and an elevation angle (E). The output of the radar signal processor 8 indicates the amplitude of radar echoes from points expressed in these polar coordinates.

The three-dimensional radar image generator 9 converts the polar coordinate information output by the radar signal processor 8 to radar image coordinate information representing position in relation to a certain viewpoint. The radar image coordinate information is expressed in a three-dimensional orthogonal coordinate system having a horizontal coordinate (X-coordinate), vertical coordinate (Y-coordinate), and depth coordinate (Z-coordinate). The output of the three-dimensional radar image generator 9 indicates the amplitude of radar echoes from points expressed in this three-dimensional orthogonal coordinate system.

The automatic detection and tracking unit 10 receives the radar signal output from the receiver 2 and extracts information about the tracks of specific moving objects, (targets). In particular, the automatic detection and tracking unit 10 identifies moving aircraft and generates target information indicating, for example, the position and velocity of each aircraft. The terrain information generator 11 has a terrain data base in which is stored positional information about stationary background terrain. Under command of the central processing unit 13, the automatic detection and tracking unit 10 and terrain information generator 11 transfer target and terrain information to the three-dimensional terrain and target image generator 12 via the data bus 14.

The three-dimensional terrain and target image generator 12 converts the terrain and target information received from the terrain information generator 11 and automatic detection and tracking unit 10 to three-dimensional terrain and target information expressed using the above-mentioned three-dimensional (X-Y-Z) orthogonal coordinate system. Target information from the automatic detection and tracking unit 10 is converted, for example, to airplane-shaped symbols indicating both position and direction of flight. The output of the three-dimensional terrain and target image generator 12 comprises image values and Z-coordinate values for points specified by their X- and Y-coordinates. The image values comprise at least luminance information, and may also comprise chrominance information if a color display is used.

The depth coordinate buffer 15 temporarily stores the Z-coordinate values output by the three-dimensional terrain and target image generator 12, at addresses determined by the corresponding X- and Y-coordinates.

The radar image frame buffer 16 stores echo amplitude information output by the three-dimensional radar image generator 9 as image values, more specifically as luminance values, at addresses determined by the X- and Y-coordinates of the echo. However, the radar image frame buffer 16 does not store image values for echoes with Z-coordinates equal to or greater than corresponding Z-coordinate values stored in the depth coordinate buffer 15.

The terrain and target image frame buffer 17 stores the terrain and target image values output by the three-dimensional terrain and target image generator 12 at addresses determined by the corresponding X- and Y-coordinates. The video image synthesizer 18 additively combines the image values stored in the radar image frame buffer 16 with the image values stored in the terrain and target image frame buffer 17 to generate a video image that is displayed on the display unit 19, which comprises, for example, a raster-scanned monochrome or color cathode ray tube.

The antenna 1, receiver 2, radar signal processor 8, automatic detection and tracking unit 10, terrain information generator 11, central processing unit 13, data bus 14, and display unit 19 have well-known structures which will not be described here, to avoid obscuring the invention with unnecessary detail. Details of the three-dimensional radar image generator 9, radar image frame buffer 16, and video image synthesizer 18 will be given below. Details of the three-dimensional terrain and target image generator 12, depth coordinate buffer 15, and terrain and target image frame buffer 17 will be omitted because they are generally similar to details of the three-dimensional radar image generator 9 and the radar image frame buffer 16 and will be readily apparent to one skilled in the art.

Figure 2:
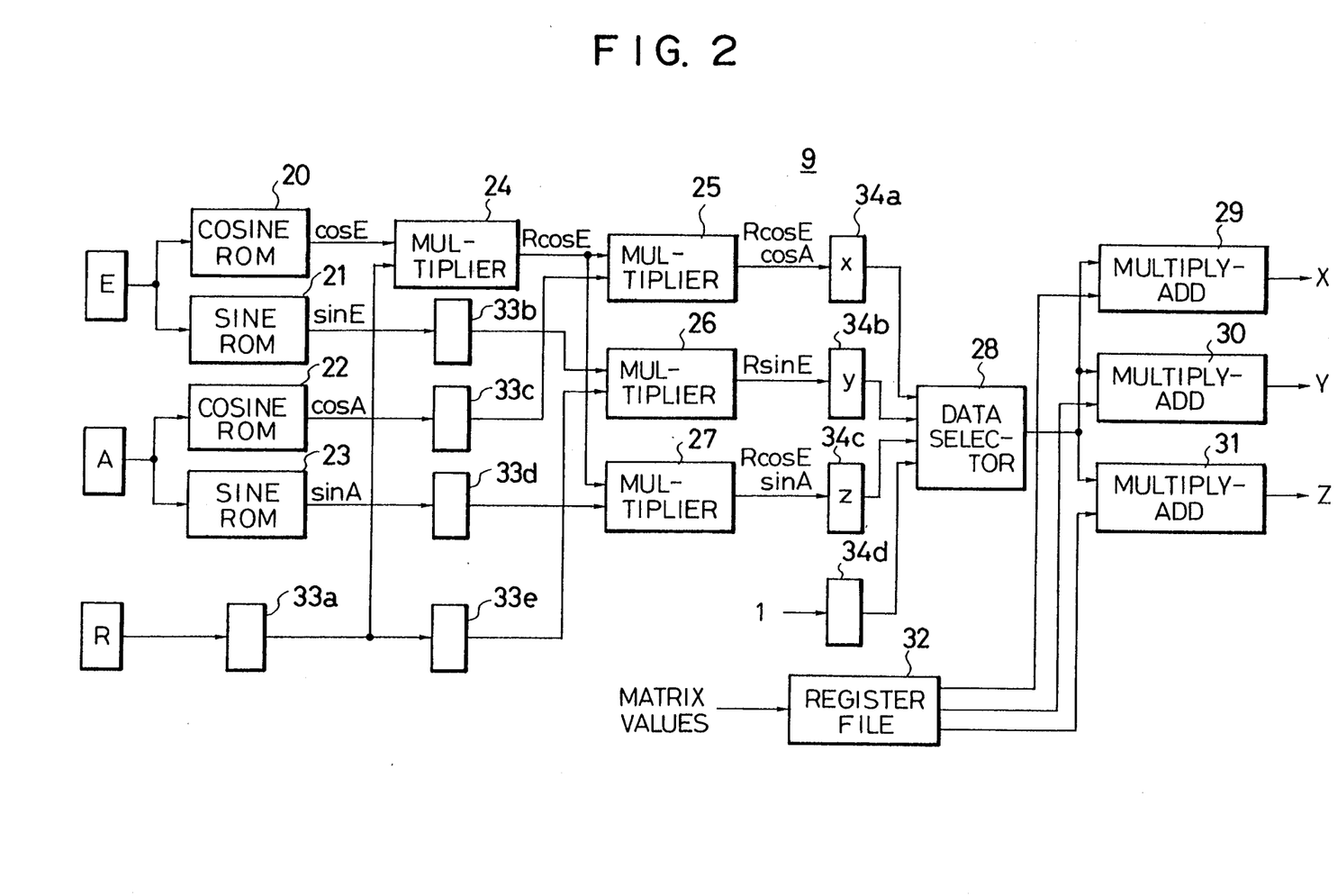
FIG. 2 illustrates a circuit for rotating and translating coordinate system in the three-dimensional radar image generator in FIG. 1.

Referring to FIG. 2, the three-dimensional radar image generator 9 comprises a cosine ROM 20, a sine ROM 21, another cosine ROM 22, another sine ROM 23, four multipliers 24, 25, 26, and 27, a data selector 28, three multiply-add units 29, 30, and 31, a register file 32, five pipeline registers 33a to 33e, and four latches 34a to 34d. The cosine ROM 20 and cosine ROM 22 are identical look-up tables that, when provided with an input value as an address, generate output data giving the cosine of the input value. The sine ROM 21 and sine ROM 23 similarly generate the sine of their inputs. (ROM is an abbreviation of read-only memory.) The multipliers, latches and other elements in FIG. 2 are standard digital circuits.

Figure 3:
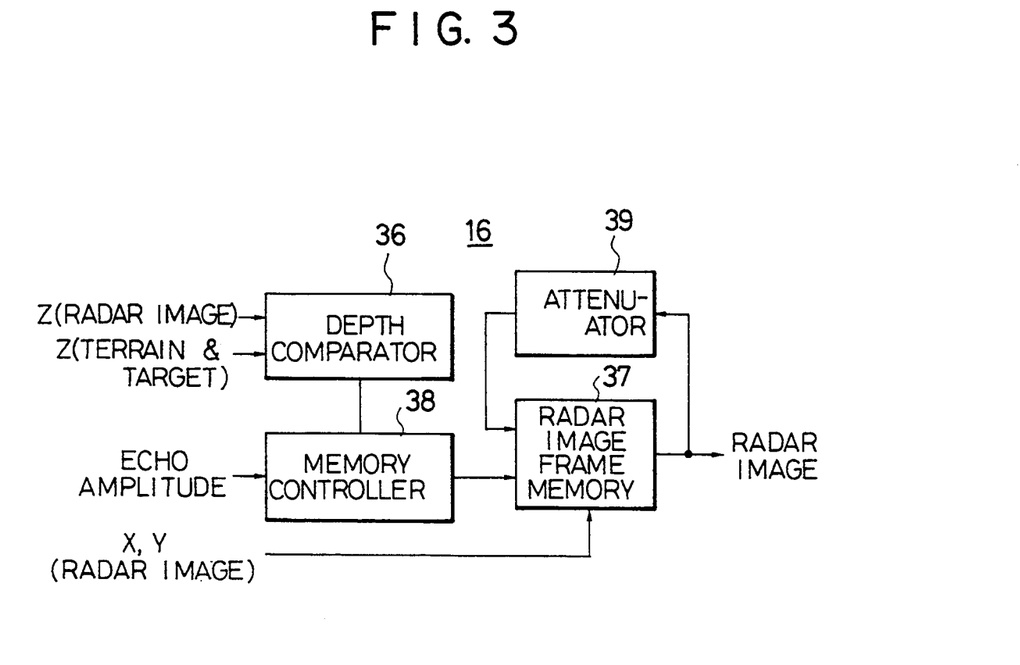
FIG. 3 is a more detailed block diagram of the radar image frame buffer in FIG. 1.

Referring to FIG. 3, the radar image frame buffer 16 comprises a depth comparator 36, a radar image frame memory 37, a memory controller 38, and an attenuator 39. The depth comparator 36 compares Z-coordinate values received from the three-dimensional radar image generator 9 with Z-coordinate values stored in the depth coordinate buffer 15, and generates an enable signal if the Z-coordinate received from the three-dimensional radar image generator 9 is smaller, or if no Z-coordinate is stored at the corresponding address in the depth coordinate buffer 15. When enabled by this enable signal, the memory controller 38 writes echo amplitude information received from the three-dimensional radar image generator 9 as luminance information in the radar image frame memory 37, at an address determined by the X- and Y-coordinates of the echo. The information stored in the radar image frame memory 37 is read out in a fixed address order to generate frames of radar image data suitable for display on the display unit 19. The attenuator 39 receives the radar image information output from the radar image frame memory 37, attenuates the image values, and writes the attenuated image values back into the radar image frame memory 37 at the same address with a suitable delay.

The radar image frame memory 37 comprises, for example, one or more dual-port memory devices adapted for random-access writing and serial reading. The other elements in FIG. 3 comprise well-known digital circuits for comparing, multiplying, and writing data.

Figure 4:
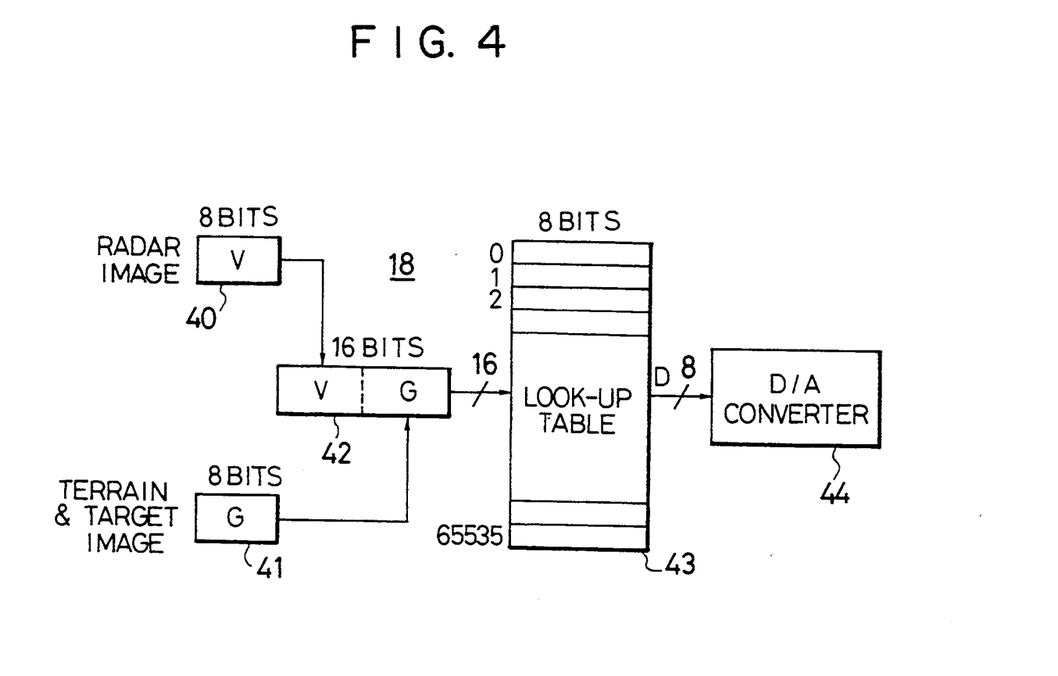
FIG. 4 is a more detailed block diagram of the video image synthesizer in FIG. 1.

Referring to FIG. 4, the video image synthesizer 18 comprises a pair of registers 40 and 41, an address register 42, a look-up table 43, and a digital-to-analog converter 44. The register 40 stores eight-bit image data V received from the radar image frame buffer 16. The register 41 stores eight-bit target and terrain image data G received from the terrain and target image frame buffer 17. The address register 42 concatenates the eight-bit data from the registers 40 and 41 into a sixteen-bit value specifying an address in the look-up table 43. The look-up table 43 outputs eight-bit data D stored at this address to the digital-to-analog converter 44 for conversion to an analog signal. The look-up table 43 comprises one or more memory devices storing data to be described later.

Next the operation of the invention will be explained.

The antenna 1 transmits radar pulses in different directions, scanning the sky in, for example, a nodding pattern. By processing the returning echoes, the receiver 2 generates a radar signal, the amplitude of which corresponds to the strength of the echo. The radar signal also contains information about the direction, range, and velocity of the object that produced the echo: direction information is obtained by correlating the radar signal with the antenna direction, range information by measuring the time delay between transmitted pulse and returning echo, and velocity information by noting the doppler frequency shift. From the amplitude, direction, and range information contained in the radar signal, the radar signal processor 8 generates digital information giving the amplitude of echoes from points expressed in polar coordinates. The automatic detection and tracking unit 10 also analyzes velocity information to identify moving targets, and outputs information about the position and velocity of these targets. Details of these operations will be omitted since they are well known.

Figure 5:
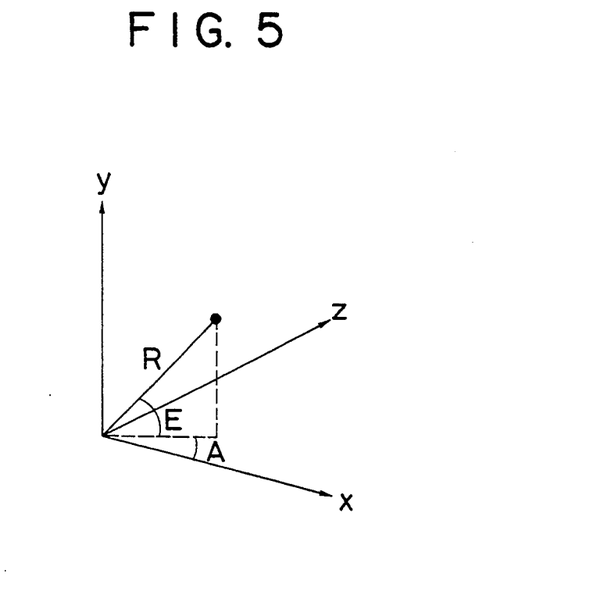
FIG. 5 illustrates the relationship between polar and orthogonal coordinate systems.

FIG. 5 illustrates the polar coordinate system employed by the radar signal processor 8 in relation to an orthogonal coordinate system with origin at the radar antenna 1. The three axes of the orthogonal coordinate system are denoted by small letters x, y, and z, with the positive x-axis corresponding to azimuth (A) and elevation (E) angles of zero, the positive y-axis to the elevation angle of ninety degrees, and the positive z-axis to an azimuth angle of ninety degrees and elevation angle of zero. The x-y-z coordinates are accordingly related to the range (R), azimuth angle (A), and elevation angle (E) as follows:

$$x = R \cdot \cos E \cdot \cos A$$

$$y = R \cdot \sin E$$

$$z = R \cdot \cos E \cdot \sin A$$

The three-dimensional radar image generator 9 converts the R-E-A coordinate system of the radar signal processor 8 to the above x-y-z coordinate system, then performs a further transaformation from the x-y-z coordinate system to the X-Y-Z coordinate system, which represents position in relation to a viewpoint not necessarily be located at the radar antenna 1. This further transformation comprises a rotation and a translation, and may also comprise a perspective projection and zoom transformation. For the present, only the rotation and translation will be described.

It is well known that a rotation and translation can be carried out by a single matrix operation of the following form:

$$\begin{bmatrix} X \\ Y \\ Z \end{bmatrix} = \begin{bmatrix} m_{x1} & m_{x2} & m_{x3} & m_{x4} \\ m_{y1} & m_{y2} & m_{y3} & m_{y4} \\ m_{z1} & m_{z2} & m_{z3} & m_{z4} \end{bmatrix} \cdot \begin{bmatrix} x \\ y \\ z \\ 1 \end{bmatrix}$$

Normally $M_{y1}$ and $m_{y3}$ are equal to zero and $m_{y2}$ to unity, so that the Y-axis remains vertical with respect to the ground. The X-axis is the horizontal axis and the Z-axis is the depth axis. The X-Y-Z coordinate system thus represents the viewing space of a viewer looking in the direction of the positive Z-axis, with the positive X-axis extending horizontally to his right.

Referring again to FIG. 2, the three-dimensional radar image generator 9 carries out the above coordinate transformation as follows. From the elevation and azimuth angles E and A, the cosine and sine ROMs 20 to 23 generate cosE, sinE, cosA, and sinA. These values and the range value R are stored in the pipeline registers 33a to 33e. The multipliers 24 to 27 multiply these values to generate R·cosE·cosA, R·sinE, and R·cosE·sinA, which are stored in the latches 34a to 34c as the values of x, y, and z. Matrix coefficients $m_{x1}$ to $m_{z4}$ are stored in the register file 32 and supplied in an appropriate sequence to the multiply-add units 29 to 31. The data selector 28 feeds the multiply-add units 29 to 31 the values of x, y, and z and a unity value stored in the latch 34d in a corresponding sequence so that the multiply-add units 29 to 31 perform the above matrix operation, thereby generating X, Y, and Z coordinate values.

The central processing unit 13 in FIG. 1 directs the terrain information generator 11 to transfer terrain information for the area seen by the above-mentioned viewer in the X-Y-Z coordinate system to the three-dimensional terrain and target image generator 12. The three-dimensional terrain and target image generator 12 converts this information and target information received from the automatic detection and tracking unit 10 to the X-Y-Z coordinate system. In this way the three-dimensional terrain and target image generator 12 generates terrain and target image information related to the viewpoint of the above viewer. To further enhance the three-dimensional appearance of the terrain and target information, the three-dimensional terrain and target image generator 12 may add color or shading effects. The three-dimensional terrain and target image generator 12 stores the terrain and target image values in the terrain and target image frame buffer 17 at addresses corresponding to their X- and Y-coordinates, and the Z-coordinate values in the depth coordinate buffer 15 at addresses again corresponding to the X- and Y-coordinates.

As radar echoes are received by the antenna 1, the process described in FIG. 2 enables the three-dimensional radar image generator 9 to provide the radar image frame buffer 16 with the echo amplitude and with the X-, Y-, and Z-coordinates of the echo. The depth comparator 36 in FIG. 3 compares the Z-coordinates of radar echoes with the Z-coordinates of target and terrain objects having the same X- and Y-coordinates. If the Z-coordinate of the radar echo is smaller, or if there is no terrain or target object at the same X- and Y-coordinates, the depth comparator 36 sends the memory controller 38 an enable signal, causing the memory controller 38 to write the echo amplitude value in the radar image frame memory 37 at an address corresponding to the X- and Y-coordinates of the echo.

The radar image frame memory 37 accordingly stores a radar image representing backscatter from all types of radar clutter. This radar image excludes echoes from targets identified by the automatic detection and tracking unit 10 and terrain known to the terrain information generator 11, which have Z-coordinates identical to Z-coordinates in the depth coordinate buffer 15. Also excluded are echoes from clutter disposed behind targets and terrain as seen from the origin of the X-Y-Z coordinate system, because they have larger Z-coordinates. That is, the radar image is clipped where foreground terrain and targets are present. This image is read out from the radar image frame memory 37 repetitively, at the frame rate of the display unit 19.

Since the image data read out of the radar image frame memory 37 is also attenuated by the attenuator 39 and written back at the same address, radar echoes are made to decay at a certain rate on the display. The rate of decay is determined by the attenuation coefficient used by the attenuator 39 and the rate at which the attenuation is performed, which may be once per frame or a slower rate. These parameters can be adjusted depending on the desired persistence of the displayed echoes.

The memory controller 38 can be adapted so that when new information is written on old information at the same address, the new information replaces the old information unconditionally, or the new information replaces the old information only if the new information exceeds the old, or the new information is combined by an arithmetic operation with the old. These update modes can be used selectively to prevent loss of information near the center of the polar coordinate system, where echoes tend to be most dense.

The same type of clipping that is carried out in the radar image frame buffer 16 is also be carried out in the terrain and target image frame buffer 17, so that when terrain and target objects overlap, the frame buffer 17 stores only the image data for the object with the smallest Z-coordinate. The enable signal that controls clipping in the terrain and target image frame buffer 17 also controls the storing of Z-coordinates in the depth coordinate buffer 15, so that the depth coordinate buffer 15 always contains the Z-coordinate of the closest target or terrain object at a given X-Y address. The terrain and target image stored in the terrain and target image frame buffer 17 is read out at the frame rate of the display unit 19.

The radar image read out from the radar image frame buffer 16 is combined with terrain and target image read out from the terrain and target image frame buffer 17 as shown in FIG. 4. The eight-bit radar image luminance value V at given X- and Y-coordinates is combined with the eight-bit terrain and target luminance value G at the same X- and Y-coordinates to obtain a sixteen-bit address, and the eight-bit value D stored at this address in the look-up table 43 is supplied to the digital-to-analog converter 44. Being eight-bit quantities, D, G, and V take on values up to $2^8$. Let $v=V/2^8$, $g=G/2^8$, and $d=D/2^8$, so that d, g, and v take on values between zero and unity. The values of D stored in the look-up table 43 are related to the values of V and G so that the following relation holds:

$$d = v + (1-v)g$$

That is, the terrain and target image is added to the radar image, but the intensity of the terrain and target image is decreased in proportion to the intensity of the radar image. As a result, the radar image appears to be semi-transparent. Terrain and target objects disposed behind general radar clutter are not obscured, but can be seen through the clutter to a greater or lesser degree, depending on the brightness of the clutter.

The values stored in the look-up table 43 need not conform exactly to the formula given above. For example, they can be modified to incorporate a gamma correction. In any case, because the entire calculation is prestored in the look-up table 43, values of D can be obtained and fed to the digital-to-analog converter 44 at the same rate as values of V and G are input. The analog signal output by the digital-to-analog converter 44 can be supplied directly to the display unit 19 as a video signal to control the intensity of the displayed image.

Positions on the screen of the display unit 19 correspond to addresses in the radar image frame buffer 16 and terrain and target image frame buffer 17, thus to the X- and Y-coordinates of the terrain, target, and radar images. If the origin of the X-Y-Z coordinate system is on the ground and the Y-axis is vertical with respect to the ground, the display unit 19 shows the view of an observer standing on the ground.

Figure 6:
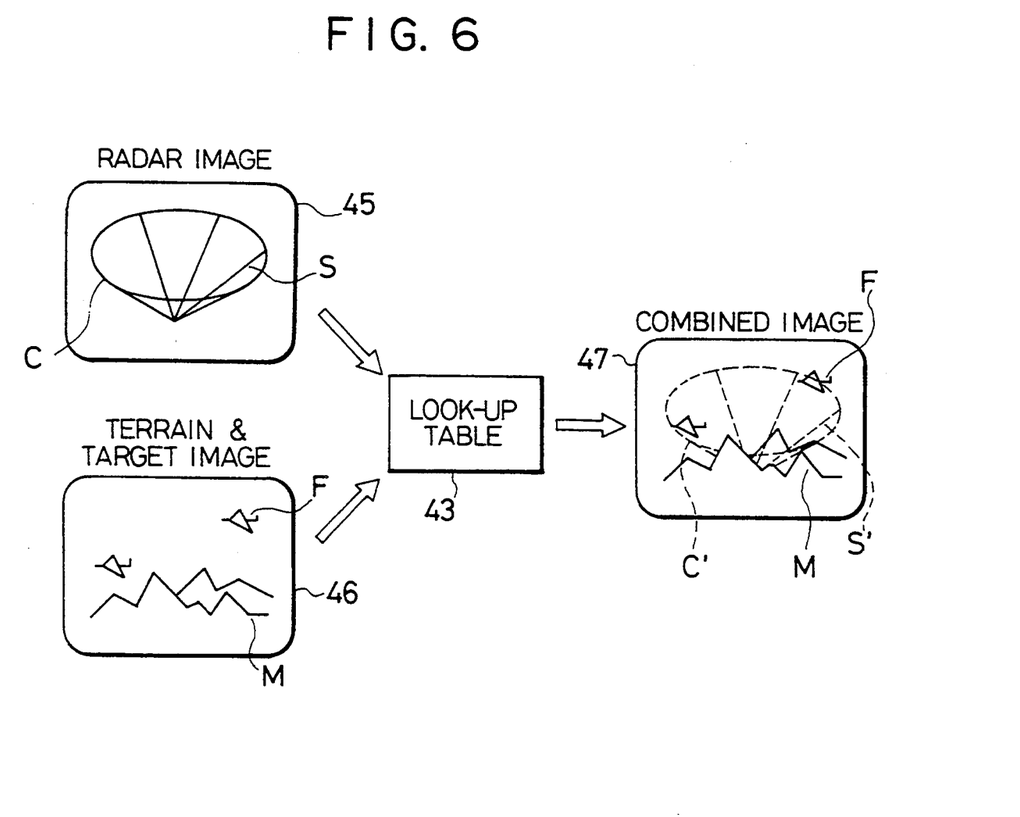
FIG. 6 illustrates how images are combined on the display unit in FIG. 1.

FIG. 6 illustrates the way in which a radar image 45 is combined with a terrain and target image 46 by the look-up table 43 to produce a combined image 47 on the display unit 19. The radar antenna is disposed between mountains located at some distance from the operator's viewpoint. In the radar image 45, the letter S indicates the backscatter image formed by radar clutter, and the circle C indicates the maximum radar range (the distance from the antenna beyond which echoes cannot be detected). In the terrain and target image 46, the letter F indicates a target identified by the automatic detection and tracking unit 10, and M indicates terrain. In the combined image 47, the radar image S' and circle C' are clipped where disposed behind terrain and target objects, but the target F and terrain M remain visible even when disposed behind the radar image.

In contrast to the conventional plan position indicator, the display in FIG. 6 gives the operator an immediate grasp of the three-dimensional relations among targets, terrain, and radar clutter. In particular, altitude relationships can be seen at a glance. Foreground-background relationships are also indicated by clipping, and by the semi-transparent appearance of the radar image. The realistic, three-dimensional appearance of the display furthermore helps the operator to distinguish between targets, terrain, and clutter.

The realism of the display can be further enhanced by having the three-dimensional radar image generator 9 (and three-dimensional terrain and target image generator 12) carry out a perspective projection transformation as well as a rotation and translation, to make nearby objects appear larger and distant objects smaller. A perspective projection transformation is carried out by dividing the horizontal and vertical coordinates by the depth coordinate.

In addition, it is possible to zoom in on a desired portion of the display by performing a translation to center that portion in the horizontal and vertical directions, then multiplying the translated horizontal and vertical coordinates by appropriate multipliers. If the horizontal translation is given by A and the vertical translation by B, and the zoom multipliers are "a" and "b," then the combined perspective projection and zoom transformation can be described as follows.

$$X' = X/Z + A$$

$$Y' = Y/Z + B$$

$$X'' = aX'$$

$$Y'' = bY'$$

Figure 7:
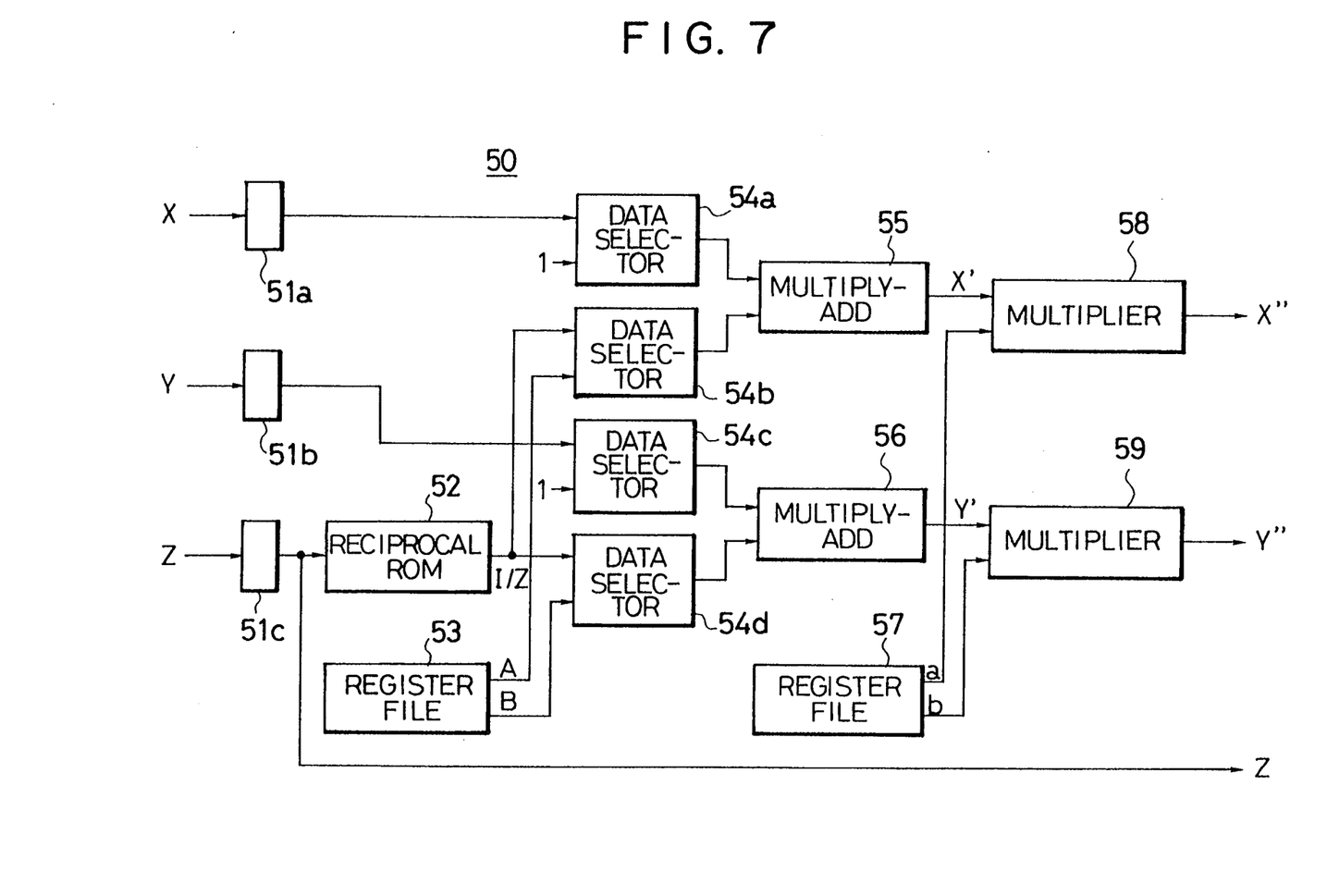
FIG. 7 illustrates a circuit for performing perspective projection and zoom transformation in the three-dimensional radar image generator in FIG. 1.

FIG. 7 shows a circuit for carrying out these transformations, comprising latches 51a to 51c, a reciprocal ROM 52, a register file 53 which stores the values of A and B, data selectors 54a to 54d, multiply-add units 55 and 56, a register file 57 which stores the values of "a" and "b," and multipliers 58 and 59. The values of X, Y, and Z are stored in the latches 51a to 51c. The value of Z is supplied to the reciprocal ROM 52, causing it to output the reciprocal of Z. The data selectors 54a to 54d supply the values of X and Y, the reciprocal of Z, the values of A and B, and unity values to the multiply-add units 55 and 56 in the appropriate sequence, so that the multiply-add units 55 and 56 can calculate X' and Y' by the formulas above. The multipliers 58 and 59 then multiply X' and Y' by "a" and "b" to obtain X" and Y".

When the circuit in FIG. 7 is employed in the three-dimensional radar image generator 9, the left side of FIG. 7 joins to the right side of FIG. 2, and the coordinate values X" and Y" are supplied to the radar image frame buffer 16 in place of X and Y. A similar modification is made to the three-dimensional terrain and target image generator 12. The other elements in FIG. 1 continue to operate as described above.

The translation values A and B and the zoom multipliers "a" and "b" can be varied under control of the operator, who can thereby zoom in on specific objects at will. Preferably, the matrix coefficients from $m_{x1}$ to $m_{z4}$ describing the original rotation and translation are also modifiable under the operator's control, enabling the operator to shift viewpoints and view the same scene from different angles, thereby obtaining further three-dimensional information. In this case the Y-axis, although always vertical on the display unit 19, need not remain vertical with respect to the ground; the operator's viewpoint can be changed so as to look up at an angle, for example, or to look down from above. These modifications can be carried out using the central processing unit 13 in FIG. 1.

The circuits in FIGS. 2, 3, 4, and 7 can be implemented using standard digital integrated circuits, or as part of one or more custom integrated circuits. Moreover, the circuits in FIGS. 2, 3, 4, and 7 can all be implemented by using software running on a suitable processor, such as a digital signal processor, to carry out the necessary multiplication, addition, comparison, and data selection operations.

This concludes the detailed description of the invention, but a few further variations will be mentioned below.

The automatic detection and tracking unit 10 has been described as generating target position and velocity information, but flight track information can also be generated, and flight tracks can be displayed on the display 19. The automatic detection and tracking unit 10 can operate by noting changes in position as well as doppler frequency shift.

The rotation, translation, perspective projection, and zoom transformations described above can also be employed in a radar system that does not specifically identify terrain and targets, but simply displays the radar image generated from the radar signal. In this case the output of the radar image frame buffer 16 in FIG. 1 need not be combined with other image information but can be supplied directly to the display unit 19.

The three-dimensional radar image generator 9, the radar image frame buffer 16, and the video image synthesizer 18 need not be configured exactly as shown in FIGS. 2, 3, 4, and 7; the same functions can be carried out with other circuit configurations. The invention is of course not restricted to eight-bit data as shown in FIG. 4; any convenient number of bits can be employed. Those skilled in the art will notice various other modifications that can be made without departing from the scope of the invention as set forth in the following claims.

What is claimed is:

1. A method of generating a radar image from a radar signal, comprising the steps of:

(a) converting said radar signal to digital information comprising echo amplitude information and polar coordinate information, said polar coordinate information including a range, an elevation angle, and an azimuth angle;

(b) converting said polar coordinate information to radar image coordinate information expressed in a three-dimensional orthogonal coordinate system having a horizontal coordinate, a vertical coordinate, and a depth coordinate, said three-dimensional orthogonal coordinate system representing position in relation to a certain viewpoint;

(c) storing said echo amplitude information as radar image values in a radar image frame buffer at addresses corresponding to said horizontal coordinate and said vertical coordinate; and (d) displaying said radar image values as image intensities on a display unit at positions corresponding to said addresses.

2. The method of claim 1, wherein said step (b) comprises the further steps of:

(b1) converting said polar coordinate information to an orthogonal coordinate system;

(b2) performing a rotation; and (b3) performing a translation.

3. The method of claim 2, wherein said rotation and said translation are performed by a matrix operation.

4. The method of claim 1, wherein said step (b) comprises the further step of performing a perspective projection.

5. The method of claim 4, wherein said perspective projection is performed by dividing said horizontal coordinate and said vertical coordinate by said depth coordinate.

6. The method of claim 1, wherein said step (b) comprises the further step of performing a zoom transformation.

7. The method of claim 6, wherein said zoom transformation is performed by adding constants to said horizontal coordinate and said vertical coordinate and multiplying resulting sums by further constants.

8. The method of claim 1, comprising the further steps of:

(e) extracting, from said radar signal, target information indicating positions of moving aircraft;

(f) generating, from prestored information, terrain information indicating positions of stationary objects;

(g) converting said target information and said terrain information to three-dimensional terrain and target information comprising terrain and target image values and terrain and target coordinate information, said terrain and target coordinate information being expressed in said three-dimensional orthogonal coordinate system;

(h) storing said terrain and target image values in a terrain and target image frame buffer at addresses corresponding to horizontal coordinates and vertical coordinates in said terrain and target coordinate information; and (i) combining said radar image values with said terrain and target image values for display on said display screen.

9. The method of claim 8, wherein a look-up table is used to carry out said step (i).

10. The method of claim 8, wherein said step (i) comprises the further steps of:

(i1) reducing said terrain and target images values in proportion to said radar image values; and adding said terrain and target image values to said radar image values.

11. The method of claim 8, comprising the further steps of:

(j) storing depth coordinate values from said terrain and target coordinate information in a depth coordinate buffer;

(k) comparing depth coordinate values of said radar image coordinate information with depth coordinate values of said terrain and target coordinate information stored in said depth coordinate buffer; and (l) clipping radar image values having depth coordinates equal to or greater than depth coordinates of terrain and target coordinate information, by not storing such radar image values in said radar image frame buffer.

12. A radar display apparatus for generating a three-dimensional radar image from a radar signal, comprising:

a radar signal processor for converting said radar signal to digital information comprising echo amplitude information and polar coordinate information, said polar coordinate information comprising a range, an elevation angle, and an azimuth angle;

a three-dimensional radar image generator, coupled to said radar signal processor, for converting said polar coordinate information to radar image coordinate information expressed in a three-dimensional coordinate system having a horizontal coordinate, a vertical coordinate, and a depth coordinate, said three-dimensional coordinate system representing position as seen from a certain viewpoint;

a radar image frame buffer coupled to said three-dimensional radar image generator, for storing said echo amplitude information as radar image values at addresses corresponding to said horizontal coordinate and said vertical coordinate; and a display unit coupled to said radar image frame buffer, for displaying said radar image values as image intensities at positions corresponding to said addresses.

13. The apparatus of claim 12, wherein said three-dimensional radar image generator comprises:

a cosine ROM for generating a cosine of said elevation angle;

a sine ROM for generating a sine of said elevation angle;

a cosine ROM for generating a cosine of said azimuth angle;

a sine ROM for generating a sine of said azimuth angle;

a first multiplier coupled to multiply the cosine of said elevation angle by said range, thereby generating a first product;

a second multiplier coupled to multiply the cosine of said azimuth angle by said first product, thereby generating an x-coordinate;

a third multiplier coupled to multiply the sine of said elevation angle by said range, thereby generating a y-coordinate;

a fourth multiplier coupled to multiply the sine of said azimuth angle by said product, thereby generating a z-coordinate;

a register file for storing matrix coefficients; and a plurality of multiply-add units coupled to multiply said x-coordinate, said y-coordinate, said z-coordinate, and a unity value by said matrix coefficients and add products thus obtained, thereby converting said x-coordinate, said y-coordinate, and said z-coordinate to an X-coordinate, a Y-coordinate, and a Z-coordinate related to said x-coordinate, said y-coordinate, and said z-coordinate by a rotation and a translation.

14. The apparatus of claim 13, wherein said three-dimensional radar image generator also comprises:

a reciprocal ROM for generating a reciprocal of said Z-coordinate;

a pair of register files for storing a first pair of constants (A and B) and a second pair of constants (a and b);

a pair of multiply-add units for multiplying said X-coordinate and said Y-coordinate by the reciprocal of said Z-coordinate and adding said first pair of constants to products thus obtained, thereby generating an X'-coordinate and a Y'-coordinate related to said X-coordinate arid said Y-coordinate by a perspective projection and a translation; and a pair of multipliers for multiplying said X'-coordinate and said Y'-coordinate by said second pair of constants, thereby performing a zoom transformation.

15. The apparatus of claim 12, further comprising:

an automatic detection and tracking unit for extracting, from said radar signal, target information indicating positions of moving aircraft;

a terrain information generator for generating, from prestored information, terrain information indicating positions of stationary objects;

a three-dimensional terrain and target image generator coupled to said automatic detection and tracking unit and said terrain information generator, for converting said target information and said terrain information to three-dimensional terrain and target information comprising terrain and target image values and terrain and target coordinate information, said terrain and target coordinate information being expressed in said three-dimensional coordinate system;

a terrain and target image frame buffer coupled to said three-dimensional terrain and target image generator, for storing said terrain and target image values at addresses corresponding to the horizontal coordinate and vertical coordinate in said terrain and target coordinate information; and a video image synthesizer coupled to said radar image frame buffer and said terrain and target image frame buffer, for combining said radar image values with said terrain and target image values for display for said display unit.

16. The apparatus of claim 15, wherein said video image synthesizer comprises:

an address register for concatenating a radar image value received from said radar image frame buffer with a terrain and target image value received from said terrain and target image frame buffer to generate an address value;

a look-up table coupled to receive said address value front said address register and output a data value; and a digital-to-analog converter for converting said data value to an analog value.

17. The apparatus of claim 15, further comprising a depth coordinate buffer for storing depth coordinate values from said terrain and target coordinate information, wherein:

depth coordinate values of said radar image coordinate information are compared with depth coordinate values of said terrain and target coordinate information stored in said depth coordinate buffer, and said radar image frame buffer stores only radar image values having depth coordinate values riot equal to or greater than corresponding depth coordinate values in said terrain and target coordinate information.

18. The apparatus of claim 17, wherein said radar image frame buffer comprises:

a depth comparator for comparing a depth coordinate received from said three-dimensional radar image generator with a depth coordinate stored in said depth coordinate buffer and generating an enable signal when the depth coordinate received from said three-dimensional radar image generator is smaller;

a radar image frame memory for storing radar image values;

a memory controller coupled to write echo amplitudes received from said three-dimensional radar image generator as radar image values in said radar image frame memory when enabled by said enable signal; and an attenuator for attenuating radar image values output from said radar image frame memory to generate attenuated radar image values, and rewriting said attenuated radar image values in said radar image frame memory.

* * * * *